US012664776B2

(12) United States Patent
Zadeh et al.

(10) Patent No.: US 12,664,776 B2
(45) Date of Patent: Jun. 23, 2026

(54) QUESTION RESPONSE GENERATION USING LANGUAGE MODELS AND LIVE STREAM VIDEO DATA

(71) Applicant: Matroid, Inc., Palo Alto, CA (US)

(72) Inventors: Reza Bosagh Zadeh, Palo Alto, CA (US); John Goddard, Palo Alto, CA (US); Ryan Wong, Palo Alto, CA (US); Darin Tay, Palo Alto, CA (US); Andrew Ellison, Palo Alto, CA (US); Huaijin Wang, Palo Alto, CA (US); Moussa Haidous, Palo Alto, CA (US); Alex Johnson, Palo Alto, CA (US); Sanil Pande, Palo Alto, CA (US); Anurag Katakkar, Palo Alto, CA (US)

(73) Assignee: Matroid, Inc., Palo Alto, CA (US)

( * ) Notice: Subject to any disclaimer, the term of this patent is extended or adjusted under 35 U.S.C. 154(b) by 334 days.

(21) Appl. No.: 18/475,092

(22) Filed: Sep. 26, 2023

(65) Prior Publication Data

US 2025/0104422 A1     Mar. 27, 2025

(51) Int. Cl.
| | |
|---|---|
| *G06V 20/40* | (2022.01) |
| *G06F 40/35* | (2020.01) |
| *G06F 40/40* | (2020.01) |
| *G06V 10/764* | (2022.01) |
| *G06V 10/94* | (2022.01) |
| *G06V 20/70* | (2022.01) |

(52) U.S. Cl.
CPC .............. *G06V 20/41* (2022.01); *G06F 40/35* (2020.01); *G06F 40/40* (2020.01); *G06V 10/764* (2022.01); *G06V 10/945* (2022.01); *G06V 20/47* (2022.01); *G06V 20/70* (2022.01)

(58) Field of Classification Search
CPC ....... G06F 40/35; G06F 40/40; G06V 10/764; G06V 10/945; G06V 20/41; G06V 20/47; G06V 20/70
See application file for complete search history.

(56) References Cited

U.S. PATENT DOCUMENTS

| | | | |
|---|---|---|---|
| 2018/0165934 A1* | 6/2018 | Pan | G06V 20/41 |
| 2020/0302177 A1* | 9/2020 | Nguyen | G06N 5/02 |
| 2023/0029278 A1* | 1/2023 | Parush Tzur | G06F 16/7328 |

* cited by examiner

*Primary Examiner* — Michael J Vanchy, Jr.
(74) *Attorney, Agent, or Firm* — Fenwick & West LLP

(57) ABSTRACT

A media detection system receives a video corresponding to a fixed field of view. The media detection system may receive user input indicating one or more object types to identify or a subset of the video within which to identify objects. The media detection system applies one or more machine-learned classifiers to frames of the video and creates a summary video that includes the background of the video and identified instances for simultaneous playback within the fixed field of view. The media detection system may also identify instances of objects in a live video stream and use the identified instances to respond to user questions. The media detection system applies a language model to questions to identify the subject matter of the questions, identifies content within the live video stream associated with the subject matter, and uses the identified content to respond to the user's question.

18 Claims, 10 Drawing Sheets

Receive a video corresponding to a fixed field of view
602

Receive a video query identifying an object type
604

Apply a machine learned classifier to frames of the video to identify instances of the object type within the video
606

Generate a summary video
608

Receive a video corresponding to a fixed field of view
702

Apply one or more machine learned classifiers to frames of the video to identify instances of an object type associated with the classifier
704

Receive a selection of instances of one or more object types
706

Generate a summary video
708

Receive a video corresponding to a fixed field of view
802

Receive a selection of a subset of the fixed field of view
804

Apply one or more machine learned classifiers to frames of
the video to identify instances of an object type within the
selected subset
806

Generate a summary video
808

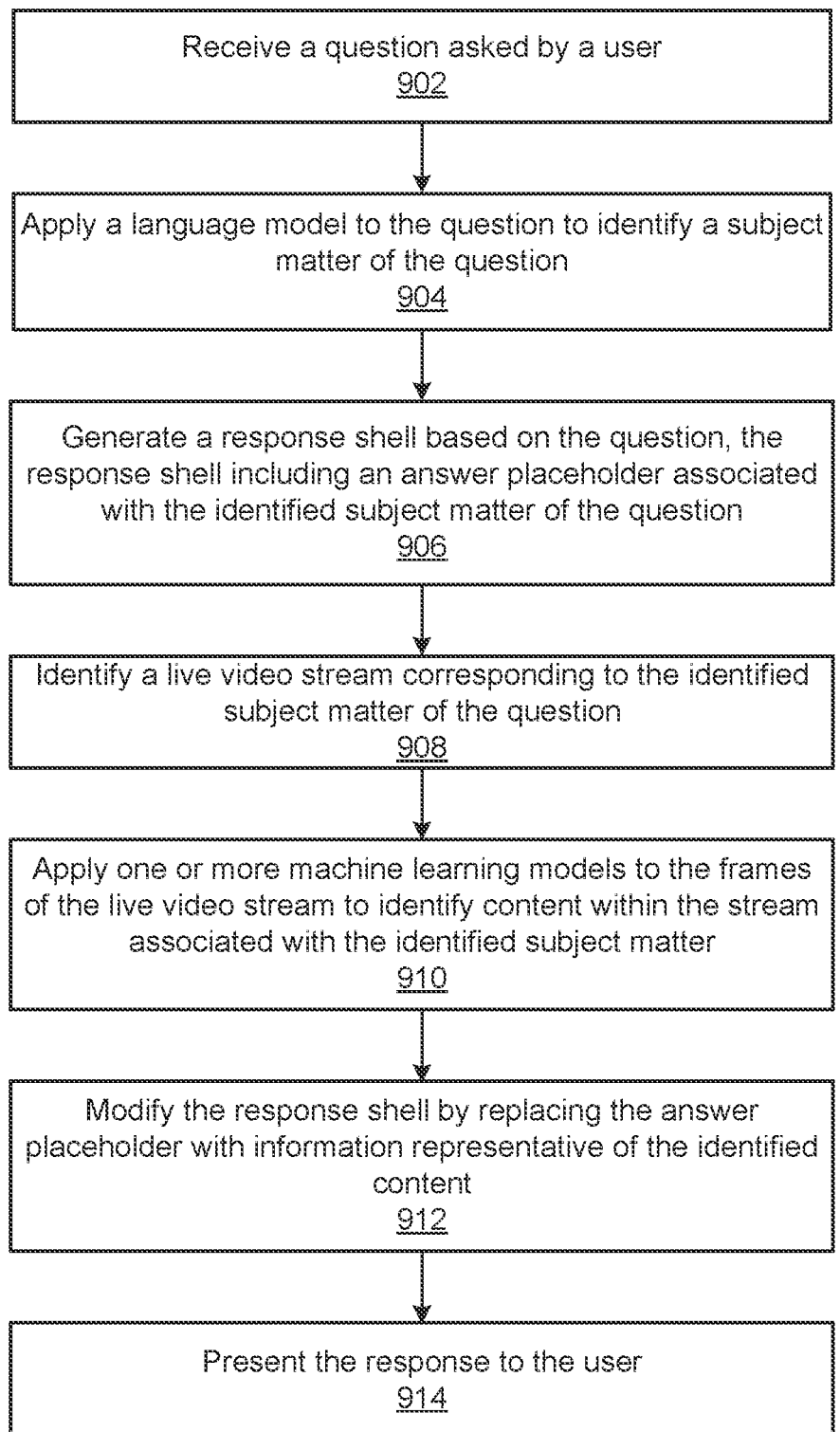

Receive a question asked by a user
902

Apply a language model to the question to identify a subject matter of the question
904

Generate a response shell based on the question, the response shell including an answer placeholder associated with the identified subject matter of the question
906

Identify a live video stream corresponding to the identified subject matter of the question
908

Apply one or more machine learning models to the frames of the live video stream to identify content within the stream associated with the identified subject matter
910

Modify the response shell by replacing the answer placeholder with information representative of the identified content
912

Present the response to the user
914

FIG. 9

QUESTION RESPONSE GENERATION USING LANGUAGE MODELS AND LIVE STREAM VIDEO DATA

BACKGROUND

1. Field of the Disclosure

This disclosure relates generally to classifying objects in media content, and more specifically to generating summaries of media content based on the classified objects.

2. Description of the Related Art

As the creation and sharing of digital media becomes more widespread, it becomes increasingly difficult to process the flood of information to find desired information within content. For example, the number of video files that are created and shared on the Internet have exceeded what can be manually reviewed by one or even a team of curators. In addition, text-based search engines are limited in the subject matter within video they can identify. Further, generating summary video content requires manual identification and curation of relevant portions of video. Accordingly, there is a need for a solution to automate the searching of video content and the generation of summary video content based on the search results.

SUMMARY

Described herein are systems and methods of generating summary videos for media content items. In one embodiment, a method includes receiving a video corresponding to a fixed field of view such that a background of the video is consistent for an above-threshold portion of the video and receiving a video query identifying an object type. The method further includes identifying instances of the object type as the instances move within the fixed field of view by applying a machine-learned classifier to frames of the video. The method includes generating a summary video that includes the background of the video and the identified instances for simultaneous playback within the fixed field of view.

In another embodiment, one or more machine-learned classifiers are applied to frames of the video, where each classifier is configured to identify instances of a different object type. The method includes receiving a selection of instances of one or more object types and generating a summary video that includes the background of the video and the selected instances for simultaneous playback within the fixed field of view, each instance labelled by its object type.

In another embodiment, a method includes receiving a selection of a subset of the fixed field of view of the video and applying one or more machine-learned classifiers to frames of the video to identify instances of object types within the subset. The method involves generating a summary video that includes the background of the video within the subset and the instances identified within the selected subset for simultaneous playback within the fixed field of view.

In a different embodiment, a method includes receiving a question asked by a user and applying a language model to the question to identify a subject matter of the question. The method further includes generating a response shell based on the received question, the response shell including an answer placeholder associated with the subject matter. To fill in the answer placeholder, the method includes identifying a live video stream corresponding to the identified subject matter, applying one or more machine-learned classifiers to frames of the live video stream to identify content within the stream associated with the subject matter, and modifying the response shell by replacing the answer placeholder with information representative of the identified content to produce a response. The response is then presented to the user.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present disclosure can be readily understood by considering the following detailed description in conjunction with the accompanying drawings.

FIG. 9 illustrates a process of responding to a user question using information from live stream video data, according to an embodiment.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

System Overview

Figure 1:
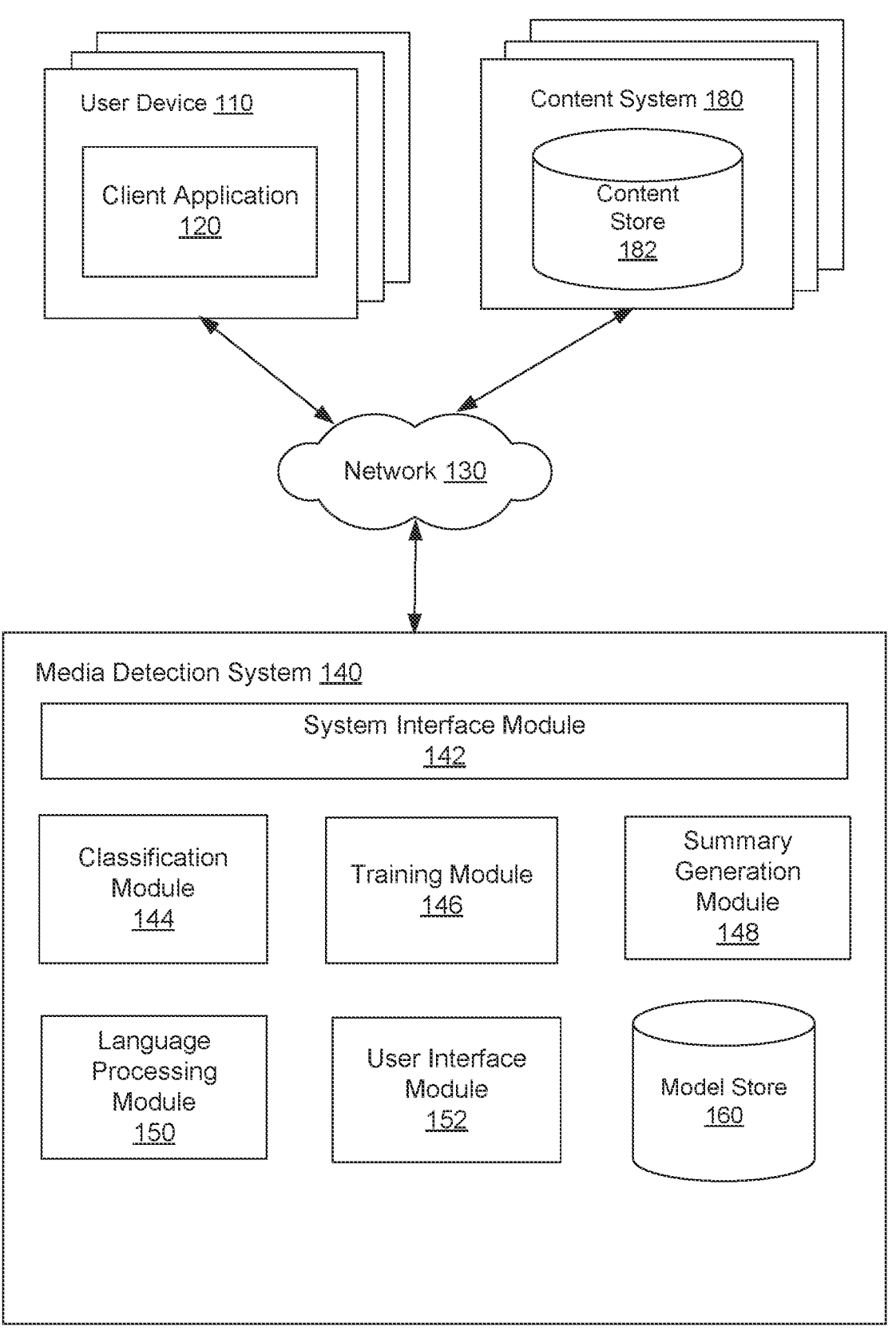
FIG. 1 is a block diagram of an overall system environment illustrating a media detection system providing media detection services, according to an embodiment.

FIG. 1 is a block diagram of an overall system environment illustrating a media detection system 140 providing object identification services, according to an embodiment. The media detection system 140 searches for instances of objects in media content items and uses the identified instances to generate summary videos. The media detection system 140 provides user interfaces that allow users to customize summary videos, view summary videos, and ask questions to be responded to with answers derived from objects identified in live stream videos. As shown in FIG. 1, the overall system environment includes the media detection system 140, one or more user devices 110, one or more content systems 180, and a network 130. Other embodiments may use more or fewer or different systems than those illustrated in FIG. 1. Functions of various modules and systems described herein can be implemented by other modules and/or systems than those described herein.

A user device 110 (also referred to herein as a "client device") is a computing system used by users to interact with the media detection system 140. A user interacts with the media detection system 140 using a user device 110 that executes client software, e.g., a web browser or a client application 120, to connect to the media detection system 140 (via the system interface module 142). The user device 110 displayed in these embodiments can include, for example, a mobile device (e.g., a laptop, a smart phone, or a tablet with operating systems such as Android or Apple IOS etc.), a desktop, a smart automobiles or other vehicles, wearable devices, a smart TV, and other network-capable devices.

The user device 110 can present media content provided by the media detection system 140 or a content systems 180. In some embodiments, the user device 110 includes an embedded video player adapted for various media formats used in the media detection system 140, an application configured for video playback, or a web browser that can play media hosted by a remote or cloud system.

A content system 180 is a computing system that generates and/or hosts media content. For example, the content system provides a media content hosting service that users can upload, browse, search for, stream, and/or play media content items. As another example, the content system 180 may be a media server that can host live video streams. As an additional example, the content system 180 is a network video camera that captures images of its surrounding area and streams the captured content. The content system 180 may include a content store 182 that stores media content items.

The network 130 facilitates communication between the user devices 110 and the media detection system 140. The network 130 is typically the Internet, but may be any network, including but not limited to a LAN, a MAN, a WAN, a mobile wired or wireless network, a cloud computing network, a private network, or a virtual private network.

The media detection system 140 includes a system interface module 142, a classification module 144, a training module 146, a summary generation module 148, a language processing module 150, a user interface module 152, and a model store 160, all of which are further descried below. Other conventional features of the media detection system 140, such as firewalls, load balancers, authentication servers, application servers, failover servers, and site management tools are not shown so as to more clearly illustrate the features of the media detection system 140. The illustrated components of the media detection system 140 can be implemented as single or multiple components of software or hardware. In general, functions described in one embodiment as being performed by one component can also be performed by other components in other embodiments, or by a combination of components. Furthermore, functions described in one embodiment as being performed by components of the media detection system 140 can also be performed by one or more user devices 110 in other embodiments if appropriate.

The system interface module 142 coordinates communication between the user devices 110, the content systems 180, and the media detection system 140. The system interface module 142 may transmit media content items and/or user interfaces back and forth between the user devices 110. For example, the system interface module 142 may receive media content items from the user devices 110 and/or the content systems 180. The system interface module 142 may additionally process media content items or interface with other modules of the media detection system 140 to process media content items. The system interface module 142 may store the media content item in the content store 182, a storage system where media content items are stored.

As described herein, a media content item is a file (i.e., a collection of data) including media content such as pictures, videos, live video streams, movie clips, games, sound tracks, and the like. The file can be various file formats. In some embodiments, a media content item may be a video corresponding to a fixed field of view. A fixed field of view is a field of view of a video that does not substantially change (e.g., shift in position, get narrower or wider) throughout the video. An example media content item with a fixed field of view may be video from a stationary security camera, where the camera that recorded the video was fixed in a stationary position. As an additional or alternative definition, a media content item with a fixed field of view may be a video for which the background of the media content item is consistent for an above-threshold portion of the video. For example, for a media content item that is a video of an intersection (e.g., recorded by a traffic camera), the video may largely include stationary objects in the background that are consistent over the course of the video, such as roads, buildings, signs, or other nearby natural or architectural features. While the video may also include moving objects, such as people or vehicles, instances of these objects may be less consistently shown in the video, as they move in and out of the frame. Although videos are used as examples to illustrate operations of the media detection system 140, this is done for the purpose of simplicity, and is not intended to be limiting in any way.

The system interface module 142 may process media content items received from the user devices 110 and/or from the content systems 180. As one example of processing, the system interface module 142 may assign a unique media content item identifier to a media content item. The media content item can be identified by the unique media content item identifier. In other example, the system interface module 142 may associate a media content item with metadata. Metadata may include, for example, a location (e.g., URL (Uniform Resource Locator)) of the media content item, a title of the media content item, and keywords describing the media content item. Keywords may describe the source which recorded the media content item or an entity (e.g., an organization, corporation, or group) with whom a media content item is associated. For example, for a media content item recorded by a camera above a traffic light, the system interface module 142 may assign the media content item a label describing the streets at the intersection. As another example, for a media content item recorded by a security camera in a company building, the system interface module 142 may assign the media content item a label indicating the company. Other example processing operations include formatting (e.g., transcoding), compression, metadata tagging, content analysis, classification/detection, other data processing, or summary video generation, which is described with respect to the summary generation module 148. The system interface module 142 may process media content items locally.

In some embodiments, the system interface module 142 may process media content items automatically, without any user input. For example, the system interface module may receive a new media content item and automatically store the new media content item in the content store 182. In some embodiments, the system interface module 142 may transmit, for display to a user of the user device 110, suggestions to process one or more media content items and may process suggested media content items responsive to user feedback or approval.

In some embodiments, the system interface module 142 may process media content items based on requests received from the user devices 110. As part of a request, a user of the user device 110 may select a media content item for processing. In some embodiments, the user may select a media content item from a set of media content items stored by the content system 180. The user may search the content system 180 by interfacing with a native search interface of a content system 180 via a user interface (e.g., user interface module 152). The user searches by typing in key words (e.g., "$14^{th}$ and $6^{th}$ traffic camera") in the native search interface. In some embodiments, the user may select a media content item from a set of media content items presented to the user in a user interface. In another embodiment, the user may select a media content item by providing the system interface module 142 with the location of the media content item, such as a URL to the media content item. Also, as part of a request, the user may select the type of processing. For example, the user may select summary video generation as the type of processing. In this example, the user may provide additional information, such as a video query identifying one or more object types to include in the summary video or a selection of a subset of a media content item to generate a summary video for. Additional details of these user inputs are described with respect to the summary generation module 148.

The classification module 144 applies one or more machine-learned classifiers to a media content item. Each classifier is trained to identify instances of a particular object type in the media content item. For example, one classifier may be trained to identify instances of vehicles in the media content item, while another classifier may be trained to identify instances of people in the media content item. Example classifiers may be regression models, decision trees, random forest, support vector machines, k nearest neighbors, or naïve bayes. The machine-learned classifiers may also include neural networks, such as perceptrons, multilayer perceptrons, convolutional neural networks, recurrent neural networks, sequence-to-sequence models, generative adversarial networks, or transformers. To generate an output from an input, a classifier uses a set of parameters (e.g., weights), generated in an iterative training process, as described with respect to the training module 146.

In the case where the media content item is a video, the classification module 144 may split the video into frames and apply the one or more classifiers to a set of the frames. A frame is a still image associated with a timestamp of the video. The number of frames in a video depends on the video's length and frame rate. For example, a ten-second video with a frame rate of 24 frames per second (fps) has 240 frames. In some embodiments, the classification module 144 may apply the one or more classifiers to each frame in the video. In other embodiments, the classification module 144 may apply the one or more classifiers to a subset of the frames in the video (e.g., every other frame, every third frame). The latter approach reduces the number of times the classification module 144 applies the one or more classifiers, allowing the classification module 144 to process a video more quickly and using less computing power.

The classification module 144 inputs the set of frames of the video into a classifier trained to identify instances of a particular object type. For each frame, the classifier may output a likelihood that one or more instances of the particular object type exist within the frame. The classifier may output a confidence score representative of the likelihood that the frame includes an instance of the object type or may output a Boolean result of the classification (e.g., "true" if the frame includes an instance of the object type or "false" if not). In some embodiments, the classifier may detect multiple instances of the object type within the frame.

In some embodiments, the classification module 144 may associate the instances identified by the machine learned classifier with the timestamp(s) of the frame(s) within which they were identified. For example, say a video of a parking lot includes a black car arriving within the video's field of view at noon and staying for an hour. In this example, a classifier trained to identify instances of vehicles may identify the black car in the video as an instance of a vehicle and may associate the instance with timestamps of the frames between 12:00 pm and 1:00 pm. The timestamp of the instance is a time at which the instance of the object appears within the original video. If the black car were to leave the field of view of the video at 1:00 pm only to return at 1:15 pm to stay for fifteen minutes, the classifier would identify each appearance of the black car as a separate instance, one with timestamps between 12:00 pm and 1:00 pm and the other with timestamps between 1:15 pm and 1:30 pm.

The classification module 144 may associate the instances identified by the machine learned classifier with a set of locations. A location may be represented by a set of pixels and their coordinates or the coordinates of the center of the instance. Each location in the set of locations may correspond to the location of the instance in a frame in which the instance was identified. For example, if an instance was identified in three frames, the set of locations would include three locations. To continue with the example, if the instance was stationary in the three frames (e.g., a parked car), the three locations would be the same, whereas if the instance was moving in the three frames, the locations would be different.

The training module 146 trains the classifiers to identify instances of an object of a particular object type within a frame of the selected media content item. The training module 146 trains a classifier based on a set of training examples. Each training example includes input data to the classifier labelled by the expected output of the classifier. Training examples may include frames of videos labelled by whether the frame includes an instance. In some embodiments, frames that include instances may be labelled with the locations of the instances.

The training module 146 trains each classifier through an iterative process in which the classifier's parameters are updated. In the training process, the training module 146 applies the classifier to the input data in the training example to generate an output, or "classification prediction," based on a current set of parameter values. The training module 146 then determines a loss function, where the loss indicates the difference between the classification predictions and the corresponding classification labels for the training instance. The loss is higher when the classifier model performs poorly and lower when the classifier model performs well. Some example loss functions include the mean square error function, the mean absolute error, hinge loss function, and the cross entropy loss function. The training module 146 updates the parameters of the classifier model to reduce the loss function. For example, the training module 146 may apply gradient descent operations to update the set of parameters.

In some embodiments, the training module 146 may update classifier models using user feedback. For example, if a user confirms or disapproves a classifier model's output for an instance in a media content item, the training module 146 may include the media content item as a training example, with the label for the instance being based on the user feedback. The update may be performed concurrently when the classifier model is being employed.

The training module 146 may also train a language model, such as the language model described with respect to language processing module 150. The training module 146 may train the language model to receive tokens corresponding to a question as input and to output a subject matter of the question. The training module 146 trains a language model based on a set of training examples. Training examples may include frames of videos or of live stream videos labelled by the subject matter of the frame. The training module 146 may receive labels from users.

The summary generation module 148 generates a summary video for a video corresponding to a fixed field of view (referred to herein as an "original video"). The summary video includes the background of the original video as well as instances of particular object types identified in the original video. The summary video excludes information such as unidentified objects or instances of object types that are not of the particular object types. For example, for a video of a grocery store parking lot, the summary generation module 148 may generate a summary video that includes the background of the grocery store parking lot (e.g., pavement, sidewalks, buildings, trees, etc.), instances of vehicles, and instances of people, but excludes unidentified objects and instances of shopping carts.

The summary generation module 148 identifies instances of particular object types in the original video by communicating with the classification module 144 to apply one or more machine-learned classifiers to frames of the original video. From the classification module 144, the summary generation module 148 receives the identified instances of the object type, along with timestamps for when in the original video the instances occur and, optionally, locations of the instances in the original video.

The summary generation module 148 may select classifiers for the classification module 144 to apply. In some embodiments, the summary generation module 148 may receive, from a user, a video query identifying an object type and select classifiers based on the video query. For example, for a user query to look for "trucks" in the media content item, the summary generation module 148 may select a classifier trained to identify trucks. For a user query to look for "vehicles," the summary generation module 148 may select a first classifier trained to identify trucks and a second classifier to identify cars. A video query from a user may include free text (e.g., "pickup trucks") or may be text from a list of classifiers available. In some embodiments, the summary generation module may select classifiers based on the content of the media content item itself. For example, say the media content item is a video stream of an intersection. In this example, the classification module 144 may select classifiers trained to identify objects that may commonly be found at intersections, say cars, trucks, bikes, and people. The summary generation module 148 may select the one or more classifiers from classifiers stored in the model store 160.

Of the identified instances of object types, the summary generation module 148 may select a subset of the identified instances to display in the summary video. In some embodiments, the summary generation module 148 may use all the instances in the summary video. In some embodiments, the summary generation module 148 may select instances based on the number of instances for each object type, for example only using instances of a particular object type responsive to the number of instances for the object type exceeding a threshold (e.g., greater than 5 instances). In some embodiments, the summary generation module 148 may receive a selection of instances of one or more object types from the user and only use the selected instances in the summary video. In such embodiments, the received selection of instances from the user can be identified by text search query, by selecting interface elements corresponding to object types or object instances, or by selecting a displayed instance within a video playback interface as it is moving within the displayed video. In one example, the summary generation module 148 may receive a selection of all instances, while in another example, the summary generation module 148 may receive a selection of less than all instances.

The summary generation module 148 isolates the background of the original video. The summary generation module 148 may use any technique to isolate the background of the original video, including other object removal or content aware fill techniques. For example, the summary generation module 148 may isolate the background by selecting frames from the original video for which the classification module 144 did not identify any object instances.

The summary generation module 148 generates a summary video that includes the isolated background of the original video with the fixed field of view and simultaneous playback of the selected instances of one or more objects identified by the classifier. In some embodiments, the summary generation module 148 generates a summary video that is the same length of the original video. In these embodiments, simultaneous playback of the selected instances refers to playing the movement of each instance in the summary video such that the timestamps for each instance in the summary video exactly correspond to the timestamps of the instances in the original video. For example, for an instance that appears in the first two minutes of a ten-minute original video, in a ten-minute summary video, the instance would also appear for the first two minutes.

In some embodiments, the summary generation module 148 generates a summary video that is shorter than the original video. Simultaneous playback of the selected instances may refer to playing the movement of each instance in the summary video such that the timestamps for each instance in the summary video map to, but do not exactly correspond to, the timestamps of the instances in the original video. For example, for an instance that appears in the first two minutes of a ten-minute original video, in a sixty-second summary video, the instance would appear for the first twelve seconds. Simultaneous playback may also refer to playing the movement of each instance at the same time, regardless of how long each instance was in the summary video. For example, for an instance of a car that appears in the first two minutes of a ten-minute original video and an instance of a bike that appears in the last thirty seconds of the original video, in a sixty-second summary video, both the instance of the car and the instance of the bike may appear for the full sixty-seconds of the summary video.

In some embodiments, simultaneous playback may refer to playing each instance at a playback speed corresponding to each instance in the original video, such that each instance is shown in the summary video moving at the speed the instance moves at in the original video. For instance, in a three-minute video of a city park in which a first person walks through the city park within the video in a first path for the first minute, a second person walks through the city park within the video in a second path for the second minute, and a third person walks through the city park within the video in a third path for the third minute, a one minute summary video can simultaneously play the first person walking the first path, the second person walking the second path, and the third person walking the third path all at the time and at the speed they walked their respective paths in the three minute video. In such a summary video, all three people can be seen walking within the summary video at the same time, despite never appearing together within the original three-minute video.

In some embodiments, the summary generation module 148 applies text labels to each of the instances and displays the labels along with the instances in the summary video. For example, the summary generation module 148 may include text labels indicating the object type of the instance (e.g., car) or an identification number of the instance. In another example, the summary generation module 148 may label the instances with timestamps from the video. For example, the summary generation module 148 may label an instance with a timestamp corresponding to the time at which the instance first appears in the video. In some embodiments, the summary generation module 148 includes a path for each instance of the summary video, the path showing the direction of movement of the instance. Such labels can be displayed within the summary video at a location corresponding to the associated instance (e.g., floating above the instance as the instances moves within the summary video).

In some embodiments, the summary generation module 148 may generate a summary video for a portion of a video corresponding to a fixed field of view. A portion may be a subset of the original video. The portion may be any size that fits within the boundaries of the video and, as such, may be smaller than the fixed field of view of the video. The portion may be any shape, for example a rectangle, a circle, or an organic shape. The summary generation module 148 may select the portion corresponding to the greatest amount of activity within the video. The portion corresponding to the greatest amount of activity may be based on the locations of identified instances. For example, for a video showing an intersection, the summary generation module 148 may select the portion of the video corresponding to where an above-threshold number of vehicles were identified (i.e., the road). The summary generation module 148 may select the portion based on a user selection of a subset of the fixed field of view of the video. As described with respect to the user interface module 152, the user may use a variety of tools to select the portion, including tools that allow for the drawing of portions, dragging of boxes to define portions, or highlighting sections of the original video to make the summary video for. The summary generation module 148 may present the user with a suggested portion, such as the portion of the video corresponding to the greatest amount of activity, and receive a selection of the suggested portion from the user. A summary video for a portion of the original video may include the background of the entire original video or the background of just the selected portion, excluding portions of the background outside the selected portion.

In some embodiments, the summary generation module 148 may generate a summary video based on a user interaction with the video (e.g., an interaction through a user interface). For example, in a user interface, the user may be provided with tools that enable them to draw a path or boundary in the video. The summary generation module 148 may generate a summary video based on a drawn path by identifying instances that follow the drawn path or are within a threshold distance of the drawn path. The summary generation module 148 may generate a summary video based on a boundary by identifying instances on one side of the boundary or by identifying instances that cross the boundary.

In some embodiments, the summary generation module 148 may generate analytics associated with the summary video. Such analytics may include information about the identified instances, such as the number of instances of each object type, the amount of time instances spend within the summary video, the average amount of time all instances spend within the summary video, or the paths of each instance as they move across the fixed frame. The generated analytics may be displayed in association with the playback of the summary video, for instance in a dedicated interface portion corresponding to the analytics.

The language processing module 150 processes questions from users and answers the questions using information from live video streams of the content system 180. The live video streams correspond to fixed fields of view such that the background for the live video stream is consistent for an above-threshold portion of the live video stream. The language processing module 150 may receive a question from a user of the user device 110. The question may be a free-text input. For example, a question may be "How crowded is downtown Park City compared to usual?" The language processing module 150 applies a language model, for example a large language model (LLM), to the received question to identify the subject matter of the question. For example, for questions "is it snowing in Jackson Hole?" and "is it sunny in Big Sky?" the language processing module 150 may identify the subject matter of the questions to be the weather. Other examples of subject matters are traffic (e.g., "how heavy is traffic on I-5 compared to usual?"), event status (e.g., "Have people started lining up outside the theatre?"), and crowd size (e.g., "How crowded is downtown Park City compared to usual?").

The language model may be configured to receive tokens corresponding to the received question as input and to output a subject matter of the question. The language model or portions thereof may be configured as a neural network with layers of interconnected nodes. For example, the language model may be configured as a transformer model that includes encoders or decoders. Each encoder or decoder of the transformer model may include one or more attention layers, which each take query, key, and value as inputs and generate an attention score as an output. Attention scores may be fed to other layers of the transformer model. In some embodiments, portions of the language model may be configured as deep neural networks (DNN), convolutional neural networks (CNN), recurrent neural networks (RNN), long short-term memory networks (LSTM), bi-directional encoder representations from transformers (BERT), generative pre-trained (GPT) models, or any combination thereof.

During an inference process and after a training process of training the language model, as described with respect to the training module 146, the language processing module 150 receives a question from a user of the user device 110 and generates a series of tokens from the question. For example, a question may be "How crowded is downtown Park City compared to usual?" A token may encode or numerically represent a word (e.g., "crowded"), group of words (e.g., "Park City"), or sub-word (e.g., "town") in the question. A token may be a one-hot encoding vector or a dense vector. For each question, the language processing module 150 may generate one or more corresponding tokens. In one embodiment, the language processing module 150 generates a classification token [CLS] as a first token in the series of tokens.

The language processing module 150 applies the language model to the series of tokens. In one embodiment, applying the language model involves passing information through three layers, an embedding layer, a transformer model, and a classification layer. From the series of tokens, the embedding layer generates a set of input embeddings, with one input embedding corresponding to each token. An input embedding is a numerical representation of a token in a latent space. The transformer model generates a set of output embeddings from the set of input embeddings, with one output embedding corresponding to each input embedding. An output embedding is a numerical representation of a token in a latent space that takes into account information of the tokens surrounding the particular token. The classification layer receives the output embeddings from the transformer model and generates classification predictions for the tokens. The classification prediction for a token may indicate the likelihood that the token belongs to one or more subject matter categories (e.g., weather, travel, event status, crowd size). The language processing module 150 identifies the subject matter of the question based on the classification predictions. For example, the language processing module 150 may identify the subject matter based on the classification prediction for the CLS token.

The language processing module 150 generates a response shell based on the question. The language processing module 150 may generate the response shell using a language model trained to produce a response shell from a question. The structure of the language model may be like the structure of the language model described above. The response shell comprises conversational text and includes an answer placeholder. For example, for the question "How crowded is downtown Park City compared to usual?" the response shell may be "Downtown Park City is [answer placeholder] crowded than usual." The answer placeholder may be associated with the subject matter of the question. For example, for the subject matter of weather, the answer placeholder may be types of weather, such as sunny, cloudy, rainy, snowy, etc. The answer placeholder may be a yes/no or a term that shows scale (e.g., more than, same as, less than, etc.).

The language processing module 150 identifies a live video stream corresponding to the identified subject matter of the question. The language processing module 150 may identify a live video stream based on the metadata of the live video stream, for example the location of the video stream, the camera type of the video stream, or keywords associated with one or more video streams. For example, for questions including a location such as "Park City," the language processing module 150 may identify live video streams from the location of Park City, Utah.

The language processing module 150 identifies content within the live video stream associated with the identified subject matter. Content may be instances of object types. To identify content, the language processing module 150 communicates with the classification module 144 to apply one or more machine-learned classifiers to frames of the live video stream. As the video is a live video stream, the language processing module 150 may only require the classification module 144 to apply classifiers to the most recent, or the few most recent frames. The language processing module 150 may select classifiers for the classification module 144 to apply based on the subject matter. For example, for a subject matter pertaining to crowds, the language processing module 150 may select a classifier trained to identify instances of people. From the classification module 144, the language processing module 150 receives the identified instances.

The language processing module 150 modifies the response shell by replacing the answer placeholder with information representative of the identified content within the live video stream. Information representative of the identified content may have to do with the types of objects identified, the quantity of instances of each object type, or the state of the identified content relative to a different pre-known state. For example, for the question "How crowded is downtown Park City compared to usual?" the language processing module 150 may total the number of instances of people to find the state of the identified content. The language processing module 150 may compare the state to a different pre-known state, for example by comparing the number of instances of people to a known value for the average number of instances of people. So, if the language processing module 150 receives 30 instances of people from the classification module and the average number of instances of people is five, the language processing module 150 may modify the response shell by replacing the answer placeholder with the word "more," making the response "Downtown Park City is more crowded than usual."

The language processing module 150 presents the response to the user. The language processing module 150 may present a text response or a speech response. The language processing module 150 may present the response through a user interface.

The user interface module 152 generates user interfaces. The user interfaces are configured to allow users to customize summary videos, view summary videos, view information associated with the summary videos (such as analytics information, information representative of detected object instances within the summary videos, and the like), and ask questions to be responded to with answers from live stream videos. The user interfaces may also be configured to allow users to configure classifiers, including providing training data or providing feedback on classifier outputs.

The user interface module 152 generates user interfaces that allow users to have input into how summary videos are generated. For summary video generation, the user interface module 152 provides interfaces that enable users to submit video queries identifying video objects. For example, for a video showing an intersection, the user may submit video queries to identify vehicles, bikes, or people. The user interface may provide a text box within which a user may enter a free-text video query (e.g., "pickup trucks" or "minivans") or may alternatively provide a selection of a few pre-set options (e.g., vehicles, bikes, people). The user interface module 152 may allow users to select a portion of a video to make a summary video for by including selection tools in the user interface. Selection tools may include drag boxes, fixed-shapes, highlights, or other drawing tools. For example, for a video showing an intersection, the user may use drawing tools to trace around the road, prompting the summary generation module 148 to generate a summary video for objects within the traced road area. The user interface module may provide users with tools that enable them to draw paths or boundaries in a video. The user interface module 152 may allow users to make multiple video queries or to opt to not make a query, allowing the summary generation module 148 to generate a summary without user input.

The user interface module 152 generates a user interface that allows users to view summary videos. The user interface may display the summary video, which may include boxes drawn around identified object instances, labels for the type of instance, or timestamps of when the instance occurred in the original video. In some embodiments, the user interface may link to or display the original video. The user interface may provide a way for users to alter or update the summary video. For example, the user interface may allow the user to crop the summary video to view a smaller portion, re-run the summary generation with a different video query, filter object types to show or hide in the summary video, change the length of the summary video (e.g., 1 minute to 30 seconds), or change the compression of the summary video, which changes how many instances are in view in the summary video at once (e.g., from 10 instances at once to 2 instances at once).

In some embodiments, the user interface may include analytics, such as the number of instances of each object type, the amount of time instances spend within the frame of the video, a heatmap of activity of the identified instances, or paths of instances. Responsive to receiving a selection of a particular instance from a user, the user interface may provide analytics specific to the particular instance, such as the path of the instance through the video frame. The user interface module 152 may generate a user interface that includes a space for users to ask questions to be responded to with answers from live stream videos.

Example Summary Video Generation

Figure 2:
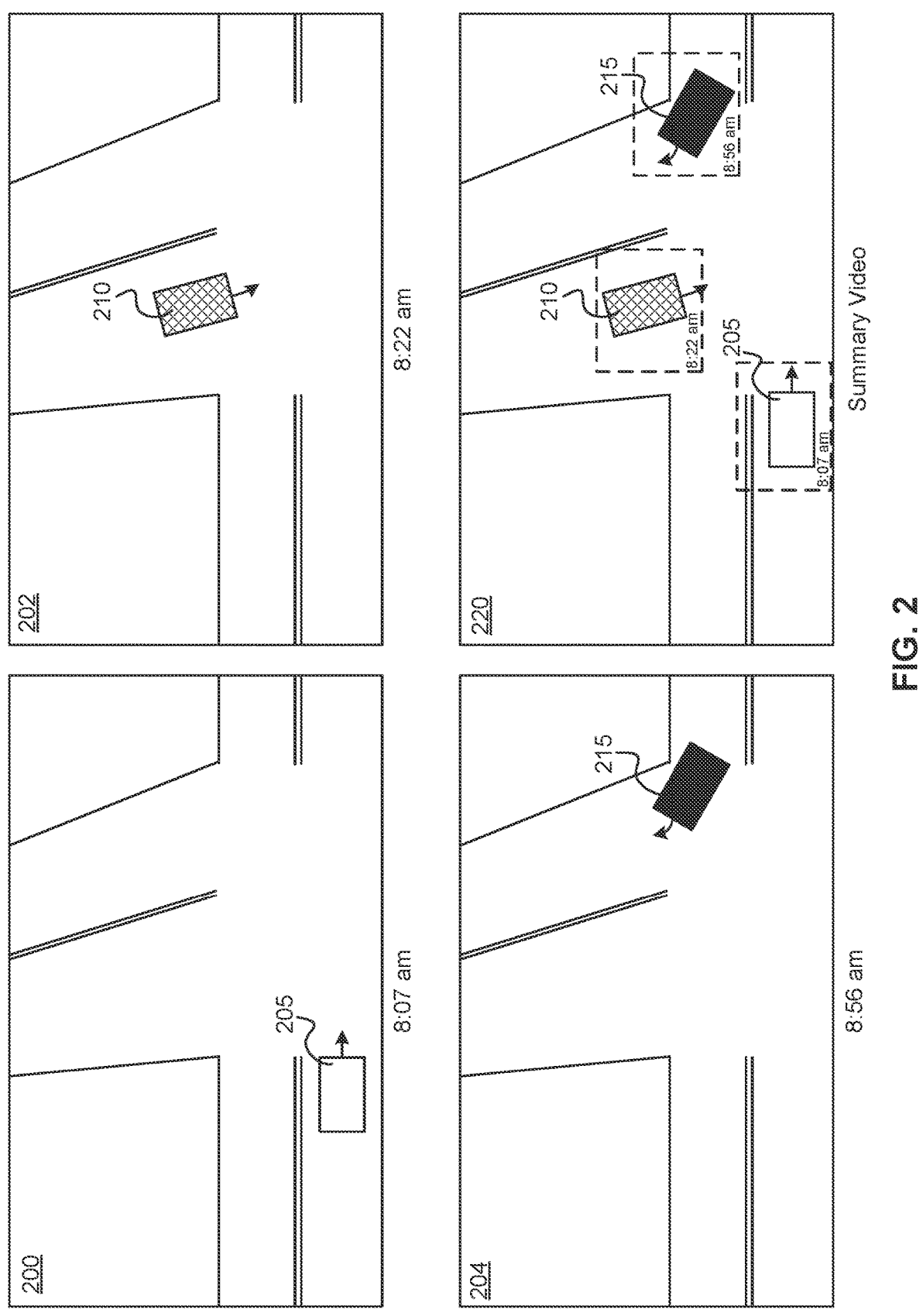
FIG. 2 illustrates an example summary video for a video corresponding to a fixed field of view, according to an embodiment.

FIG. 2 illustrates an example summary video for a video corresponding to a fixed field of view. FIG. 2 shows three frames, 200, 202, and 204, from a video of intersection and a summary video 220 for the video of the intersection. The video corresponds to a fixed field of view, meaning that, in each frame of the video (e.g., frames 200, 202, and 204), the intersection is shown from the same perspective and the background of the video (e.g., the road and area outside the road) is consistent for an above threshold portion of the video. Frame 200 corresponds to a timestamp of 8:07 am and shows a car 205, represented as a box with an arrow showing direction of movement (for illustrative purposes only). Frame 202 corresponds to a timestamp 8:22 am and shows a car 210. Frame 204 corresponds to a timestamp 8:56 am and shows a car 215. The summary video 220 includes the background of the video, namely the road depicted in each of the frames 200, 202, and 204. The summary video also includes simultaneous playback of instances of cars identified by the summary generation module 148. In this example, the identified instances of cars include the cars 205, 210, and 215 from frames 200, 202, and 204 respectively. Each instance is labelled with the timestamp when the instance appeared in the video, 8:07 am, 8:22 am, and 8:56 am respectively. The summary video 220 also includes dotted boxes surrounding each identified instance. Additional details of the process for generating a summary video are described with respect to FIG. 6.

Figure 3:
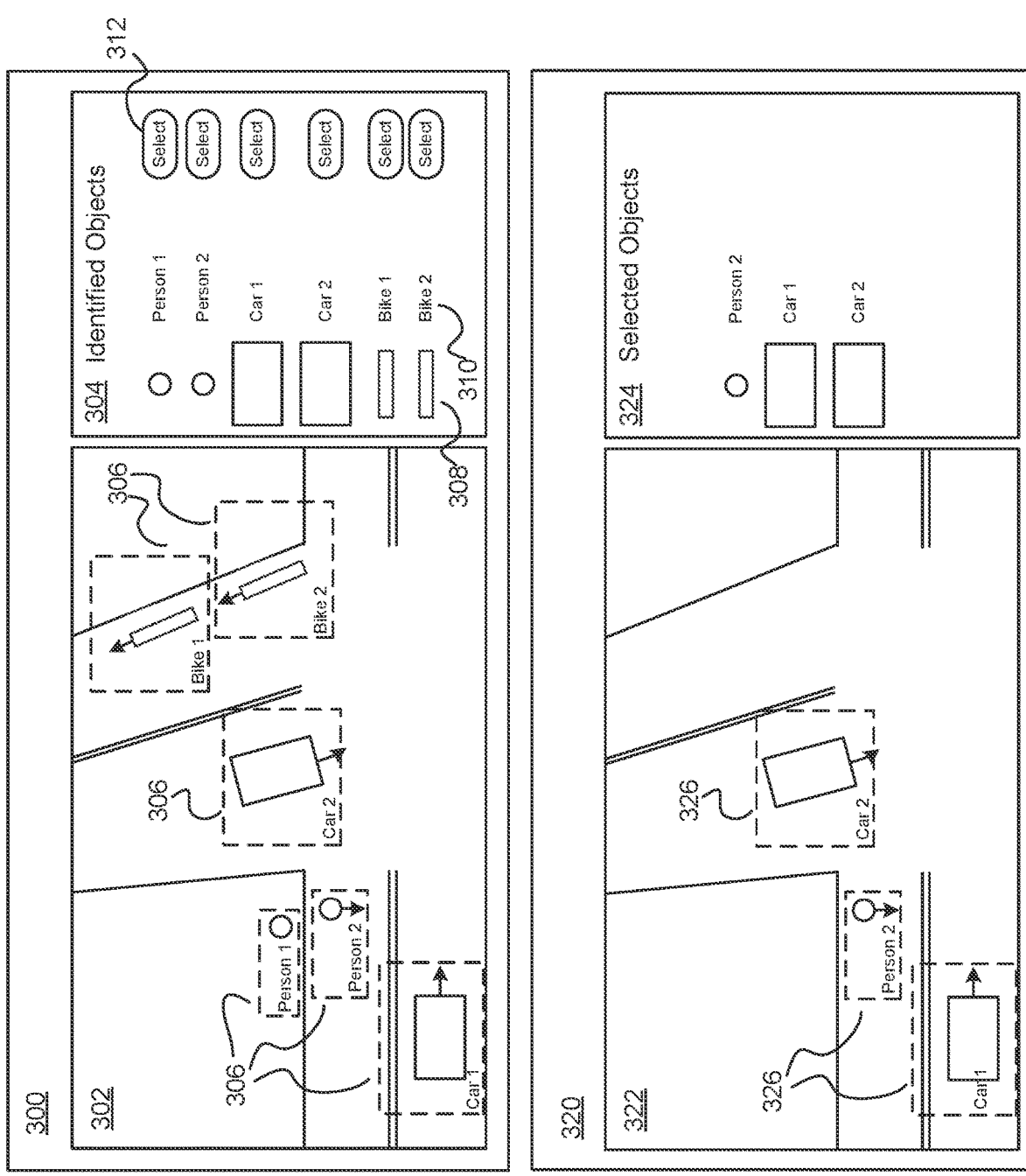
FIG. 3 illustrates an example summary video for a video corresponding to a fixed field of view, where the summary video includes user-selected object instances, according to an embodiment.

FIG. 3 illustrates an example summary video for a video corresponding to a fixed field of view, where the summary video includes user-selected object instances. FIG. 3 shows two interfaces, interface 300 and interface 320. The interfaces may be presented to a user by the user interface module 152. Interface 300 includes two panels, a video panel 302 and an identified objects panel 304. The video panel 302 shows a video of an intersection with instances 306 of three types of objects: people, cars, and bikes. Each instance 306 in the video panel 302 is an instance identified by the summary generation module 148, is surrounded by a dotted box, and is labelled by the object type of the instance and an identification number (e.g., "Person 1" and "Person 2"). The identified objects panel 304 presents the identified object instances in a list form, providing information including an image 308 of the instance, an object type of the instance 310, and a select button 312. Users may use the select buttons 312 to select instances of objects for the summary generation module 148 to include in a video summary. Interface 320 includes two panels, a video summary panel 322, and a selected objects panel 324. The video summary panel 322 shows a video summary that only includes selected object instances 326, in this case Person 2, Car 1, and Car 2. The selected objects panel presents the selected objects in a list form. Additional details of the process for generating a summary video with user-selected objects are described with respect to FIG. 7.

Figure 4:
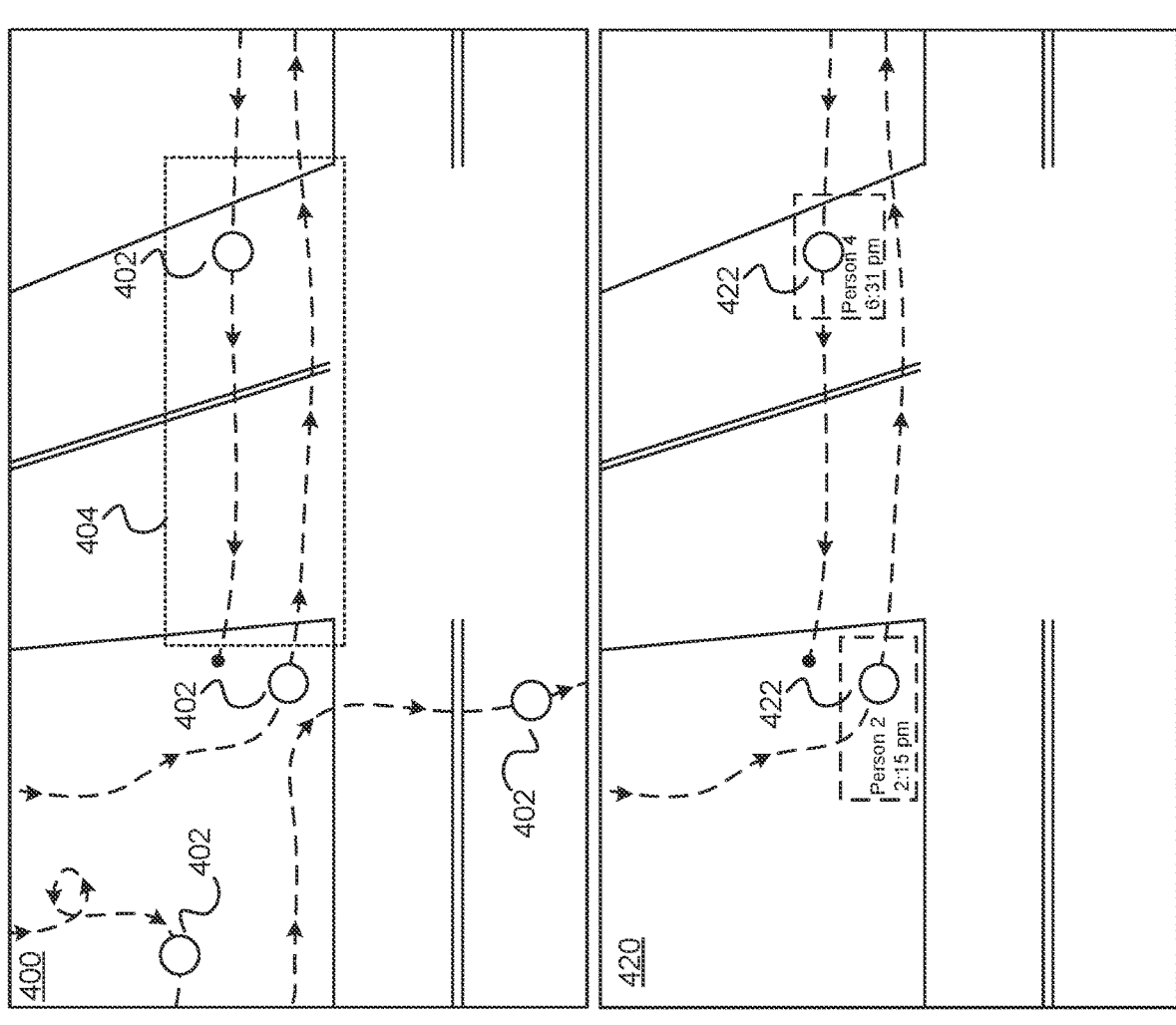
FIG. 4 illustrates an example summary video for a portion of a video corresponding to a fixed field of view, according to an embodiment.

FIG. 4 illustrates an example summary video for a portion of a video corresponding to a fixed field of view. FIG. 4 shows two panels, a panel 400 illustrates four people 402 and their respective paths across an intersection over a window of time. The panel 400 includes a dotted box indicating a portion 404 of the video. As described with respect to the summary generation module 148, the portion 404 may be selected by a user. The panel 420 is a summary video for the video. The summary video 420 includes identified instances of people 422. However, instead of including all instances of people, the summary video 420 only includes the instances that at some point in the video were inside of the portion 404. In this case, those instances are person 2, which appeared in the video at 2:15 pm, and person 4, which appeared in the video at 6:31 pm. Additional details of the process for generating a summary video for a portion of a video corresponding to a fixed field of view are described with respect to FIG. 8.

Example Question Response Generation

Figure 5:
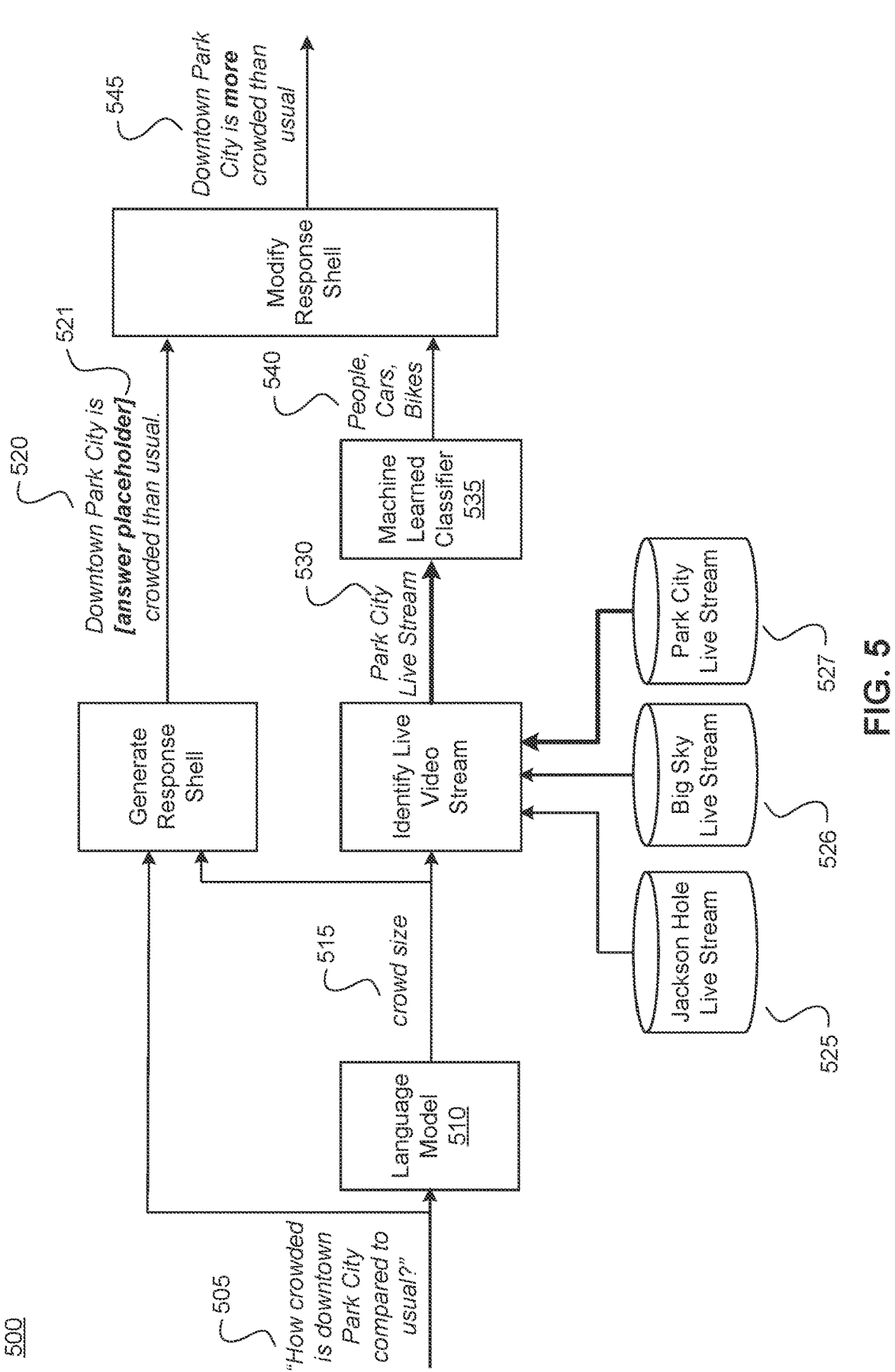
FIG. 5 illustrates an example question response generation data flow, according to an embodiment.

FIG. 5 illustrates an example question response generation data flow. The flow 500 begins with a question 505, "How crowded is downtown Park City compared to usual?" The question 505 may be a question input by a user of the user device 110. The language processing module 150 applies a language model 510 to the question 505, which outputs a subject matter 515. In this example, the question 505 asks about how crowded downtown is, so the language model 510 may identify the subject matter 515 to be "crowd size." Based on the question 505 and the subject matter 515, the language processing module 150 generates a response shell 520, "Downtown Park City is [answer placeholder] crowded than usual." The response shell 520 includes an answer placeholder 521, which may be associated with the subject matter 515. In the example, the answer placeholder 521 is associated with the subject matter 515 "crowd size." The language processing module 150 also uses the subject matter 515 to identify a live video stream. The language processing module 150 identifies a live video stream 530 associated with the identified subject matter from live video stream 525, "Jackson Hole Live Stream," live video stream 526, "Big Sky Live Stream," and live video stream 527, "Park City Live Stream." The language processing module 150 may use additional information about the question or the live streams to identify a live video stream. Live video stream 527, "Park City Live Stream," may have metadata indicating that the location of the live stream is in Park City, and as the question also contains "Park City," the language processing module 150 identifies live video stream 527 as the live video stream 530 associated with the identified subject matter. The language processing module 150 applies a machine learned classifier 535 to the live video stream 530, "Park City Live Stream." The machine learned classifier 535 identifies content in the live video stream 530 associated with the subject matter 515, "crowd size." In this case, identified content 540 includes instances of people, cars, and bikes. The language processing module 150 modifies the response shell 520 by replacing the answer placeholder 521 with information representative of the identified content 540 to produce a response 545. In the example, the answer placeholder 521 is replaced with "more," making the response "Downtown Park City is more crowded than usual."

Example Process Flows

Figure 6:
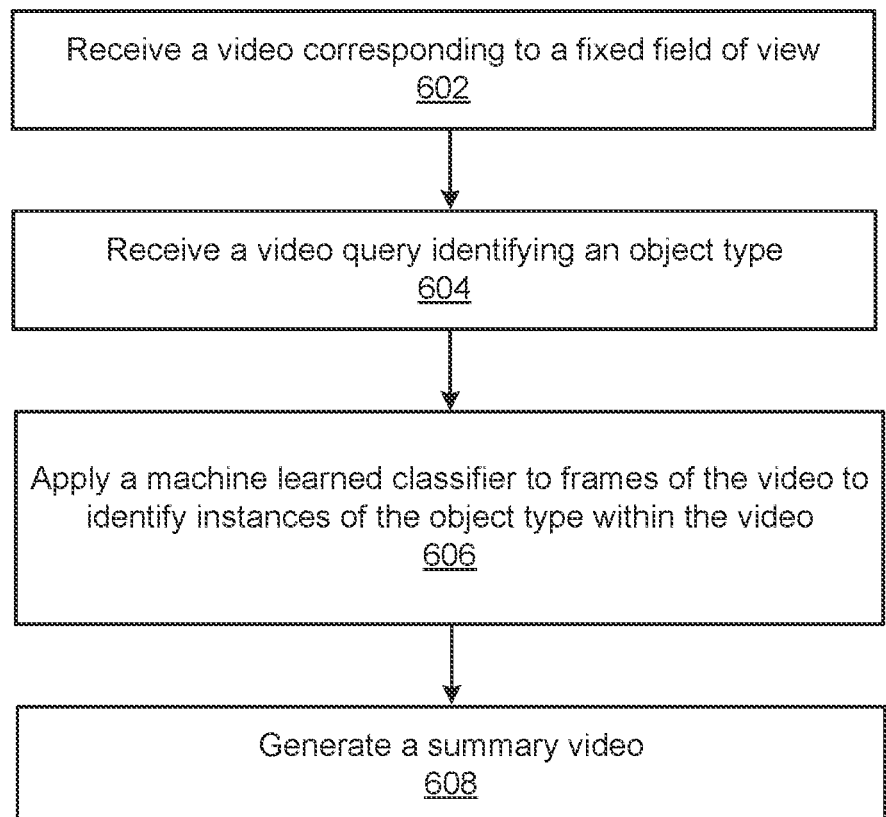
FIG. 6 illustrates a process of generating a summary video including instances of an object type, according to an embodiment.

FIG. 6 illustrates a process of generating a summary video including instances of an object type. The process starts with the media detection system 140 receiving 602 a video corresponding to a fixed field of view. The media detection system may receive the video from user devices 110 and/or from the content system 180. The media detection system 140 receives 604 a video query identifying an object type. The video query may be input by a user (e.g., through a user interface) and may identify an object type to include in the summary video. The query may be a free-text input or may be a selection from a list of pre-set object types.

The media detection system 140 applies 606 a machine-learned classifier associated with the object type to frames of the video. The machine-learned classifier identifies instances of the object type within the video as each instance of the object type moves within the fixed field of view of the video. The media detection system 140 may receive, as output of the machine-learned classifier, identified instances of the object type along with timestamps for when in the video the instances occur and, optionally, locations of the instances in the video.

The media detection system 140 generates 608 a summary video. The media detection system generates the summary video by overlaying identified instances of the object type onto a fixed background. The media detection system 140 configures the instances for simultaneous playback, playing back the movement of the identified instances over the fixed background of the summary video.

Figure 7:
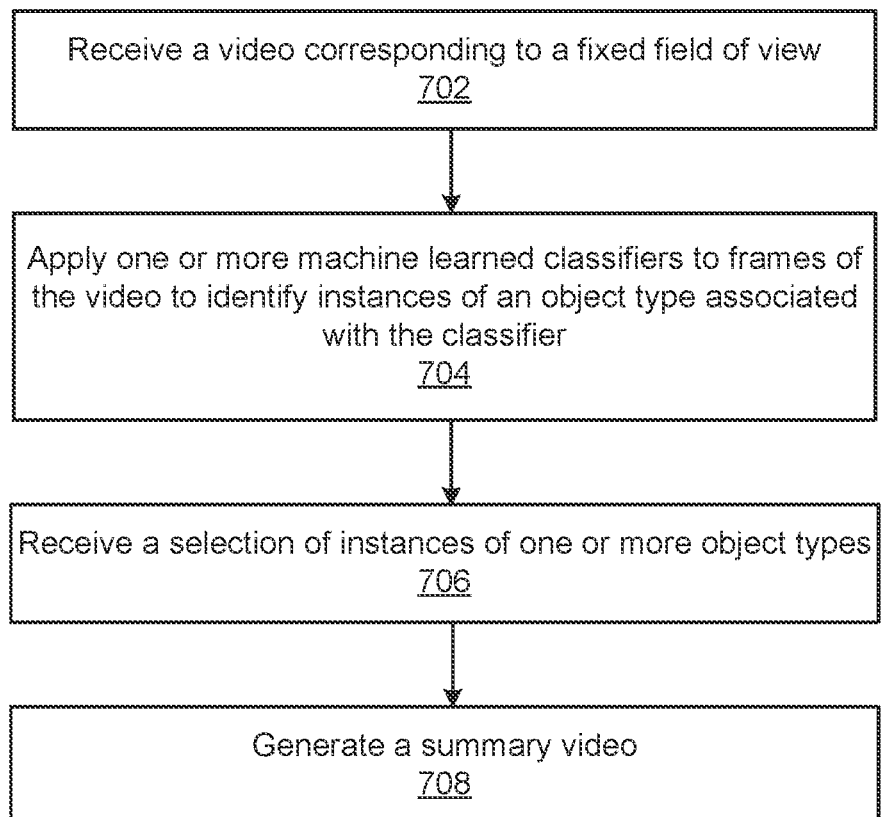
FIG. 7 illustrates a process of generating a summary video including instances of one or more object types, according to an embodiment.

FIG. 7 illustrates a process of generating a summary video including instances of one or more object types. The process starts with the media detection system 140 receiving 702 a video corresponding to a fixed field of view. The media detection system may receive the video from user devices 110 and/or from the content system 180.

The media detection system 140 applies 704 a machine-learned classifier associated with the object type to frames of the video. The machine-learned classifier identifies instances of the object type within the video as each instance of the object type moves within the fixed field of view of the video. The media detection system 140 may receive, as output of the machine-learned classifier, identified instances of the object type along with timestamps for when in the video the instances occur and, optionally, locations of the instances in the video.

The media detection system 140 receives 706 a selection of instances of one or more object types. The media detection system may receive the selection from a user of the user device 110.

The media detection system 140 generates 708 a summary video. The media detection system generates the summary video by overlaying selected instances of the one or more object types onto a fixed background. The media detection system 140 configures the instances for simultaneous playback, playing back the movement of the identified instances over the fixed background of the summary video. The generated summary video may include text labels indicating the object type of each instance.

Figure 8:
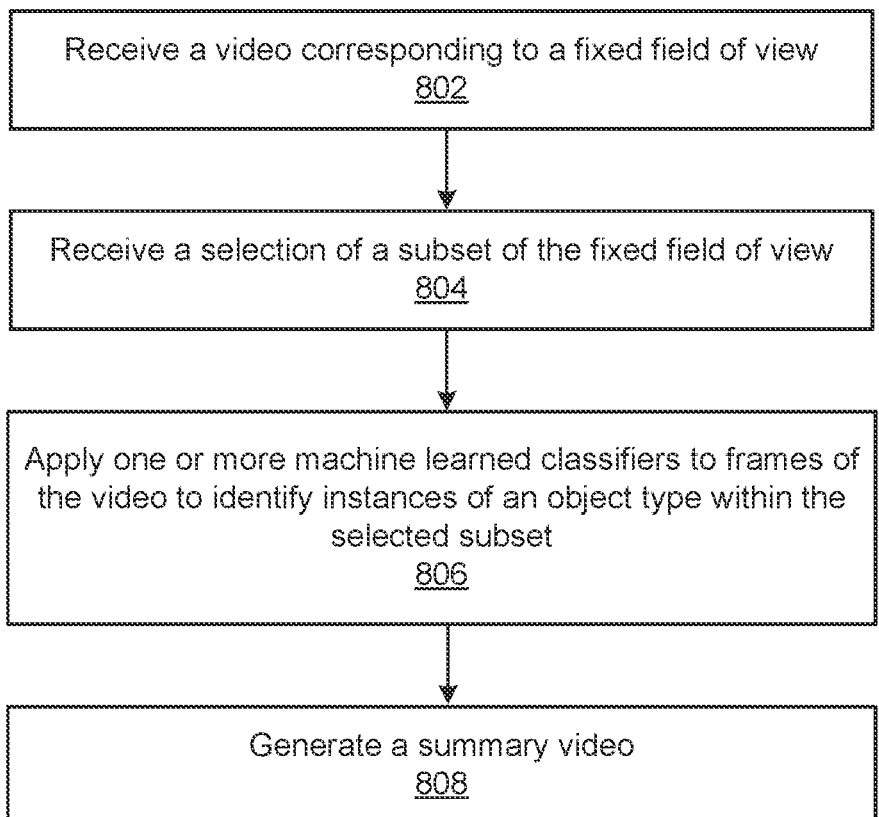
FIG. 8 illustrates a process of generating a summary video for a portion of a video, according to an embodiment.

FIG. 8 illustrates a process of generating a summary video for a portion of a video. The process starts with the media detection system 140 receiving 802 a video corresponding to a fixed field of view. The media detection system may receive the video from user devices 110 and/or from the content system 180. The media detection system 140 receives 804 a selection of a subset of the fixed field of view of the video. The media detection system 140 may receive the selection from a user of the user device 110.

The media detection system 140 applies 806 a machine-learned classifier associated with the object type to frames of the video. The machine-learned classifier identifies instances of the object type within the selected portion of the video as each instance of the object type moves within the portion. The media detection system 140 may receive, as output of the machine-learned classifier, identified instances of the object type along with timestamps for when in the video the instances occur and, optionally, locations of the instances in the video.

The media detection system 140 generates 808 a summary video. The media detection system generates the summary video by overlaying identified instances of the object type onto a fixed background. The media detection system 140 configures the instances for simultaneous playback, playing back the movement of the identified instances over the fixed background of the summary video. The summary video may include the background of the entire original video or the background of just the selected portion.

FIG. 9 illustrates a process of responding to a user question using information from live stream video data. The media detection system 140 receives 902 a question from a user of the user device 110. The question may be free text that the user inputs into a user interface.

The media detection system 140 applies 904 a language model to the received question to identify a subject matter of the question. In applying the language model, the media detection system 140 generates tokens from the question, passes the tokens through an embedding layer of the language model to generate input embeddings, passes the input embeddings through a transformer model of the language model to generate output embeddings, and passes the output embeddings through a classification layer to generate classification predictions for the tokens. The media detection system 140 identifies the subject matter of the question based on the classification predictions.

The media detection system 140 generates 906 a response shell based on the received question, the response shell including an answer placeholder associated with the identified subject matter of the question. The media detection system 140 may generate the response shell using a language model trained to produce a response shell from a question.

The media detection system 140 identifies 908 a live video stream corresponding to the identified subject matter of the question. The media detection system 140 may identify a live video stream based on the metadata of the live video stream, for example the location of the video stream, the camera type of the video stream, or keywords associated with one or more video streams.

The media detection system 140 applies 910 one or more machine-learned classifiers to frames of the live video stream to identify content within the live video stream associated with the identified subject matter. Content may be, for example, instances of object types or characteristics of the video (e.g., weather). The one or more machine-learned classifiers identify content within the live video stream, for instance by outputting information representative of the identified content.

The media detection system 140 modifies 912 the response shell by replacing the answer placeholder with information representative of the identified content within the live video stream to produce a response. Information representative of the identified content may include information representative of the types of objects identified, the number of instances of each object type, information representative of one or more characteristics of the video, and how the type of objects and number of instances or characteristics of the video compare to known information. The media detection system 140 presents 914 the response to the user.

Example Implementations

Techniques described above and throughout the specification for training classifiers, applying trained classifiers to media content, and analyzing the outputs of those classifiers may be implemented in an integrated detection unit mounted to monitor any environment or may be applied to analyze media content recorded for any environment.

The exemplary implementations described below are merely illustrative of example environments, examples of media content that may be recorded in those environments, and examples of analyses that may be performed on media content recorded tin those environments. One skilled in the art would recognize that the below exemplary implementations are not restrictive and that the techniques and processes described throughout may be applied in any other suitable environment to search any other suitable media content for any other suitable preferred content.

In one exemplary embodiment, a road environment (e.g., road, intersection) is outfitted with one or more cameras to record or live stream media content. One or more classifiers may be applied to the media content to identify traffic patterns, levels, or behavior. For example, classifiers may be applied to identify cars passing through an area, or, similarly, pedestrians or bikers. These classifiers may be useful in answering user questions pertaining to traffic such as "How busy is the freeway this morning?", "Is Main Street a safe place for pedestrians to cross?", or "Are cars parked in the bike lane?" In a more complex example, classifiers may be applied to the media content to identify traffic behavior that is out of the ordinary or unlawful, such as vehicles in a bike lane or vehicles crossing an intersection during a red light. Classifiers may be applied to the media content to identify weather conditions of the road environment such as snow or rain.

In one exemplary embodiment, a parking lot environment is outfitted with one or more cameras to record or live stream media content. One or more classifiers may be applied to the media content to identify parking lot usage or congestion. For example, for a parking lot to a stadium, applying classifiers to identify vehicles in the parking lot may provide insight into how crowded the event is, or whether the event has started. Similarly, applying classifiers to identify vehicles in a mall parking lot may provide insight into how crowded the mall is, or if stores are likely to be open. Classifiers may be applied to identify violations in parking lot usage, for example by identifying vehicles parked in designated handicap parking spaces that do not have proper handicap vehicle designations.

In one exemplary embodiment, an indoor environment (e.g., store, office building) is outfitted with one or more cameras to record or live stream media content. One or more classifiers may be applied to the media content to identify foot traffic. This information may be used to identify when the indoor environment is crowded or to identify unusual activity. For example, classifiers may identify people entering restricted areas (e.g., employees only areas) or being within the indoor environment at a restricted time (e.g., after closing).

Computer Architecture

Figure 10:
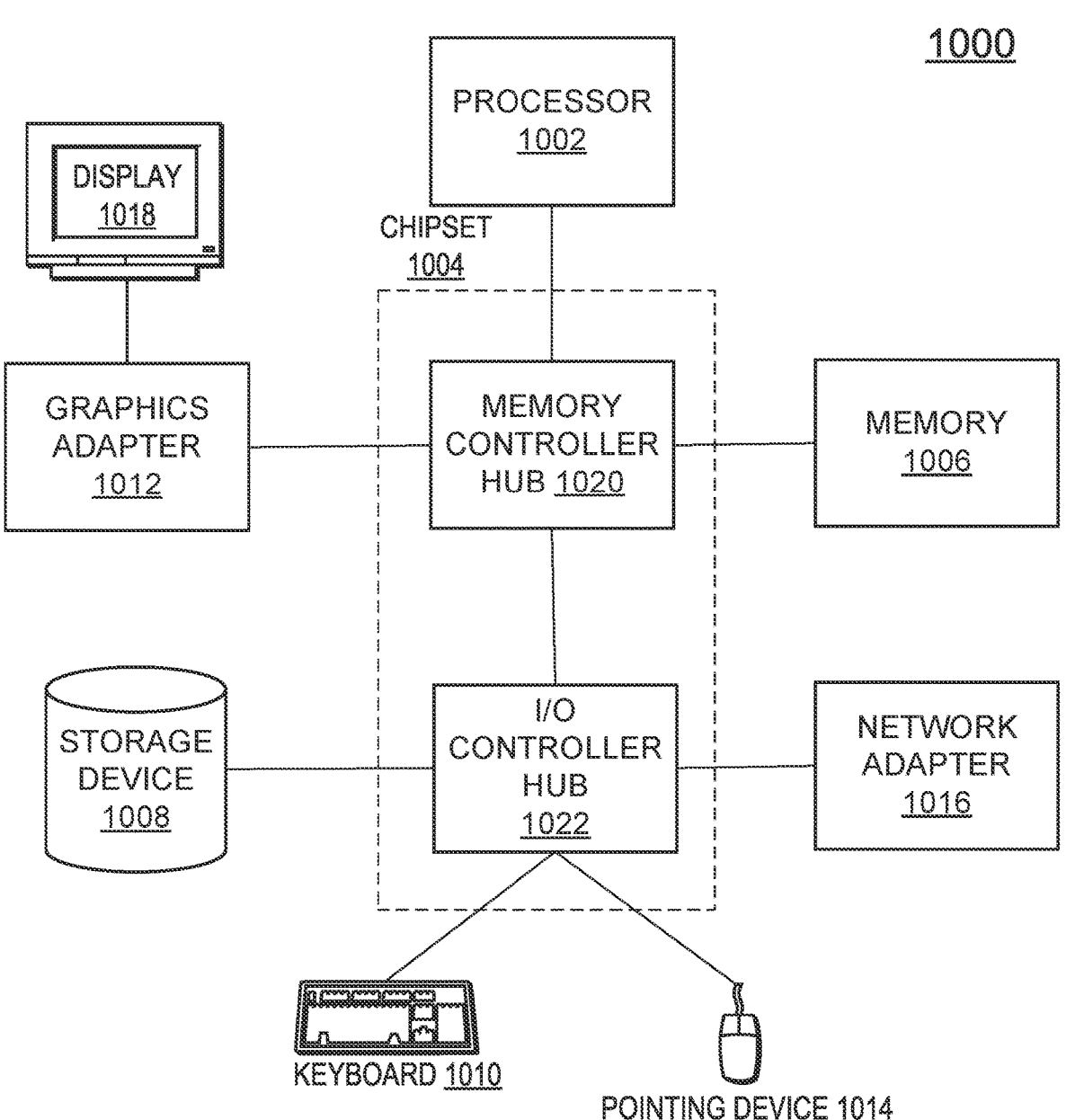
FIG. 10 is a high-level block diagram of a computer for implementing different entities illustrated in FIG. 1, according to an embodiment.

FIG. 10 is a high-level block diagram of a computer 1000 for implementing different entities illustrated in FIG. 1. The computer 1000 includes at least one processor 1002 coupled to a chipset 1004. Also coupled to the chipset 1004 are a memory 1006, a storage device 1008, a keyboard 1010, a graphics adapter 1012, a pointing device 1014, and a network adapter 1016. A display 1018 is coupled to the graphics adapter 1012. In one embodiment, the functionality of the chipset 1004 is provided by a memory controller hub 1020 and an I/O controller hub 1022. In another embodiment, the memory 1006 is coupled directly to the processor 1002 instead of the chipset 1004.

The storage device 1008 is any non-transitory computer-readable storage medium, such as a hard drive, compact disk read-only memory (CD-ROM), DVD, or a solid-state memory device. The memory 1006 holds instructions and data used by the processor 1002. The pointing device 1014 may be a mouse, track ball, or other type of pointing device, and is used in combination with the keyboard 1010 to input data into the computer system 1000. The graphics adapter 1012 displays images and other information on the display 1018. The network adapter 1016 couples the computer system 1000 to the network 130.

As is known in the art, a computer 1000 can have different and/or other components than those shown in FIG. 10. In addition, the computer 1000 can lack certain illustrated components. For example, the computer acting as the online system can be formed of multiple blade servers linked together into one or more distributed systems and lack components such as keyboards and displays. Moreover, the storage device 1008 can be local and/or remote from the computer 1000 (such as embodied within a storage area network (SAN)).

As is known in the art, the computer 1000 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 1008, loaded into the memory 1006, and executed by the processor 1002.

Alternative Embodiments

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

It is to be understood that the figures and descriptions have been simplified to illustrate elements that are relevant for a clear understanding of the present invention, while eliminating, for the purpose of clarity, many other elements found in a typical online system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the various embodiments. This description should be read to include one or at least one and the singular also includes the plural unless it is obvious that it is meant otherwise.

Upon reading this disclosure, those of skill in the art will appreciate still additional alternative designs for a unified communication interface providing various communication services. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure as defined in the appended claims.

The invention claimed is:

1. A computer-implemented method, the method comprising:

receiving a question asked by a user;

applying a language model to the received question to identify a subject matter of the question;

generating a response shell based on the received question, the response shell including an answer placeholder associated with the identified subject matter of the question;

determining an average state associated with the identified subject matter of the question;

identifying a live video stream corresponding to the identified subject matter of the question;

applying one or more machine-learned classifiers to frames of the live video stream to identify content within the live video stream associated with the identified subject matter;

determining a current state associated with the identified subject matter of the question based on the identified content within the live video stream;

modifying the response shell by replacing the answer placeholder with information representative of a comparison between the average state associated with the identified subject matter and the current state associated with the identified subject matter to produce a response; and presenting the response to the user.

2. The computer-implemented method of claim 1, wherein the subject matter of the question pertains to one or more of traffic, weather, crowd size, or event status.

3. The computer-implemented method of claim 1, wherein the response shell comprises conversational text.

4. The computer-implemented method of claim 1, wherein identifying a live video stream comprises querying one or more live video streams based on one or more of a location, camera type, or keywords associated with the one or more live video streams.

5. The computer-implemented method of claim 1, wherein the live video stream corresponds to a fixed field of view such that a background for the live video stream is consistent for an above-threshold portion of the live video stream.

6. The computer-implemented method of claim 1, wherein information representative of the identified content comprises information describing the type, quantity, or state of the identified content.

7. The computer-implemented method of claim 1, wherein presenting the response to the user comprises presenting a text or speech response.

8. A non-transitory computer-readable storage medium storing executable computer instructions that when executed by a hardware processor are configured to cause the hardware processor to perform steps comprising:

receiving a question asked by a user;

applying a language model to the received question to identify a subject matter of the question;

generating a response shell based on the received question, the response shell including an answer placeholder associated with the identified subject matter of the question;

determining an average state associated with the identified subject matter of the question;

identifying a live video stream corresponding to the identified subject matter of the question;

applying one or more machine-learned classifiers to frames of the live video stream to identify content within the live video stream associated with the identified subject matter;

determining a current state associated with the identified subject matter of the question based on the identified content within the live video stream;

modifying the response shell by replacing the answer placeholder with information representative of a comparison between the average state associated with the identified subject matter and the current state associated with the identified subject matter to produce a response; and presenting the response to the user.

9. The non-transitory computer-readable storage medium of claim 8, wherein the subject matter of the question pertains to one or more of traffic, weather, crowd size, or event status.

10. The non-transitory computer-readable storage medium of claim 8, wherein the response shell comprises conversational text.

11. The non-transitory computer-readable storage medium of claim 8, wherein instructions for identifying a live video stream comprise instructions for querying one or more live video streams based on one or more of a location, camera type, or keywords associated with the one or more live video streams.

12. The non-transitory computer-readable storage medium of claim 8, wherein the live video stream corresponds to a fixed field of view such that a background for the live video stream is consistent for an above-threshold portion of the live video stream.

13. The non-transitory computer-readable storage medium of claim 8, wherein information representative of the identified content comprises information describing the type, quantity, or state of the identified content.

14. The non-transitory computer-readable storage medium of claim 8, wherein instructions for presenting the response to the user comprise instructions for presenting a text or speech response.

15. A system, comprising:

a computer processor; and a non-transitory memory storing executable computer instructions that when executed by the computer processor are configured to cause the computer processor to perform steps comprising:

receiving a question asked by a user;

applying a language model to the received question to identify a subject matter of the question;

generating a response shell based on the received question, the response shell including an answer placeholder associated with the identified subject matter of the question;

determining an average state associated with the identified subject matter of the question;

identifying a live video stream corresponding to the identified subject matter of the question;

applying one or more machine-learned classifiers to frames of the live video stream to identify content within the live video stream associated with the identified subject matter;

determining a current state associated with the identified subject matter of the question based on the identified content within the live video stream;

modifying the response shell by replacing the answer placeholder with information representative of a comparison between the average state associated with the identified subject matter and the current state associated with the identified subject matter to produce a response; and presenting the response to the user.

16. The system of claim 15, wherein the subject matter of the question pertains to one or more of traffic, weather, crowd size, or event status.

17. The system of claim 15, wherein the response shell comprises conversational text.

18. The system of claim 15, wherein instructions for identifying a live video stream comprise instructions for querying one or more live video streams based on one or more of a location, camera type, or keywords associated with the one or more live video streams.

* * * * *